Figure 1:
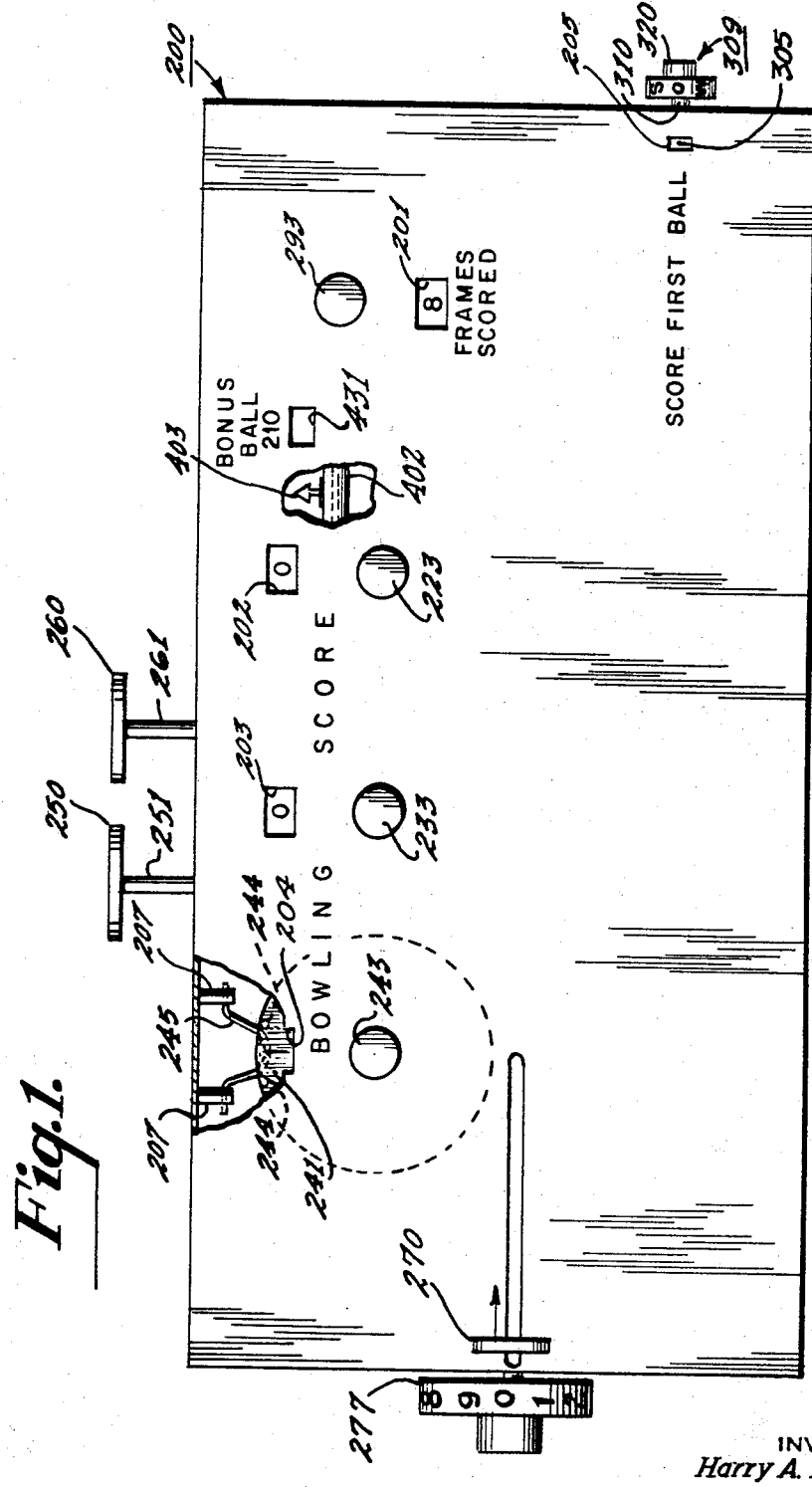

Oct. 22, 1968　　　　H. A. McCLISTER　　　　3,406,902
BOWLING SCORER

Filed June 13, 1966　　　　　　　　　　　　　　8 Sheets-Sheet 1

INVENTOR
Harry A. McClister
BY John R. Ewbank

ATTORNEY.

Oct. 22, 1968  H. A. McCLISTER  3,406,902
BOWLING SCORER
Filed June 13, 1966  8 Sheets-Sheet 2
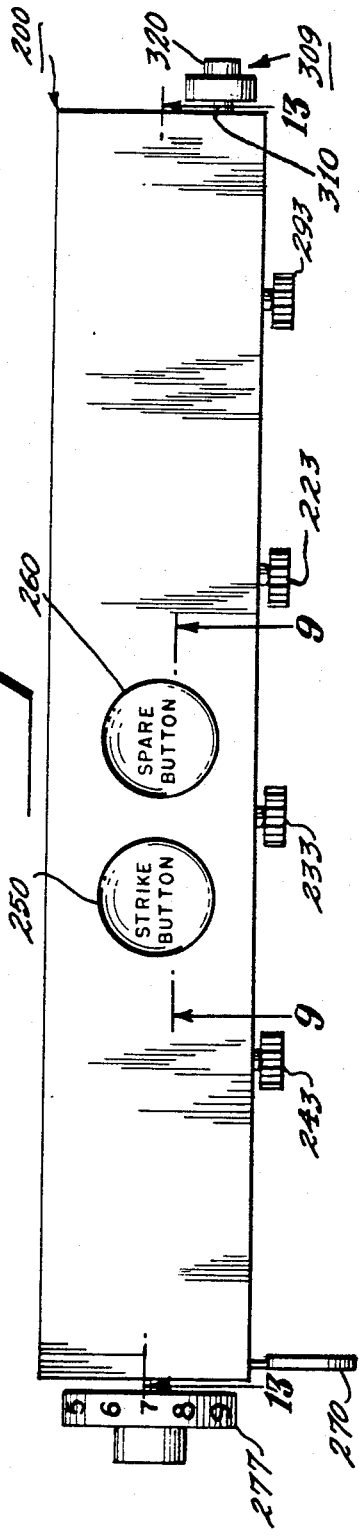
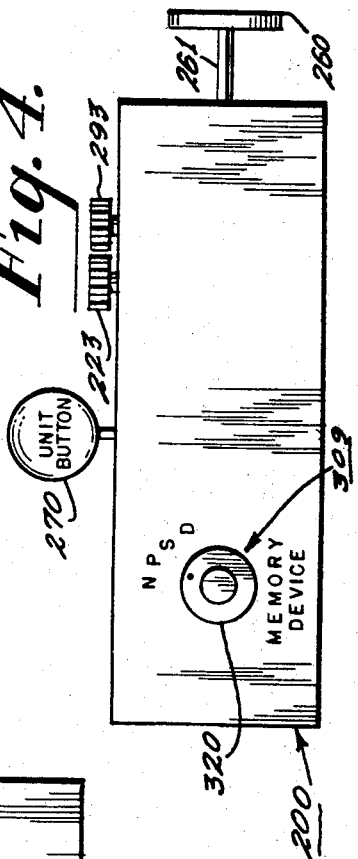
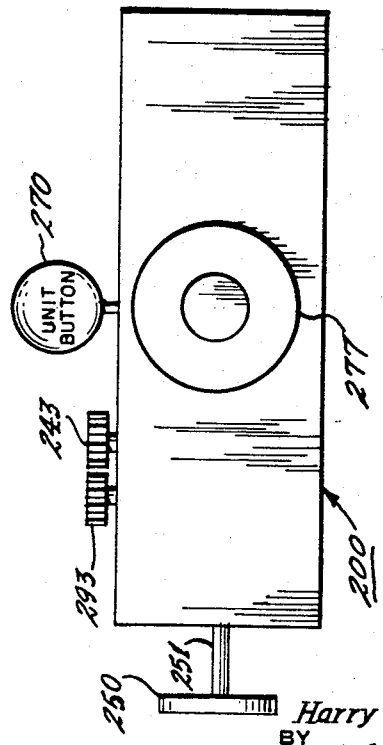
INVENTOR.
Harry A. McClister
BY
John R. Eubank
ATTORNEY.

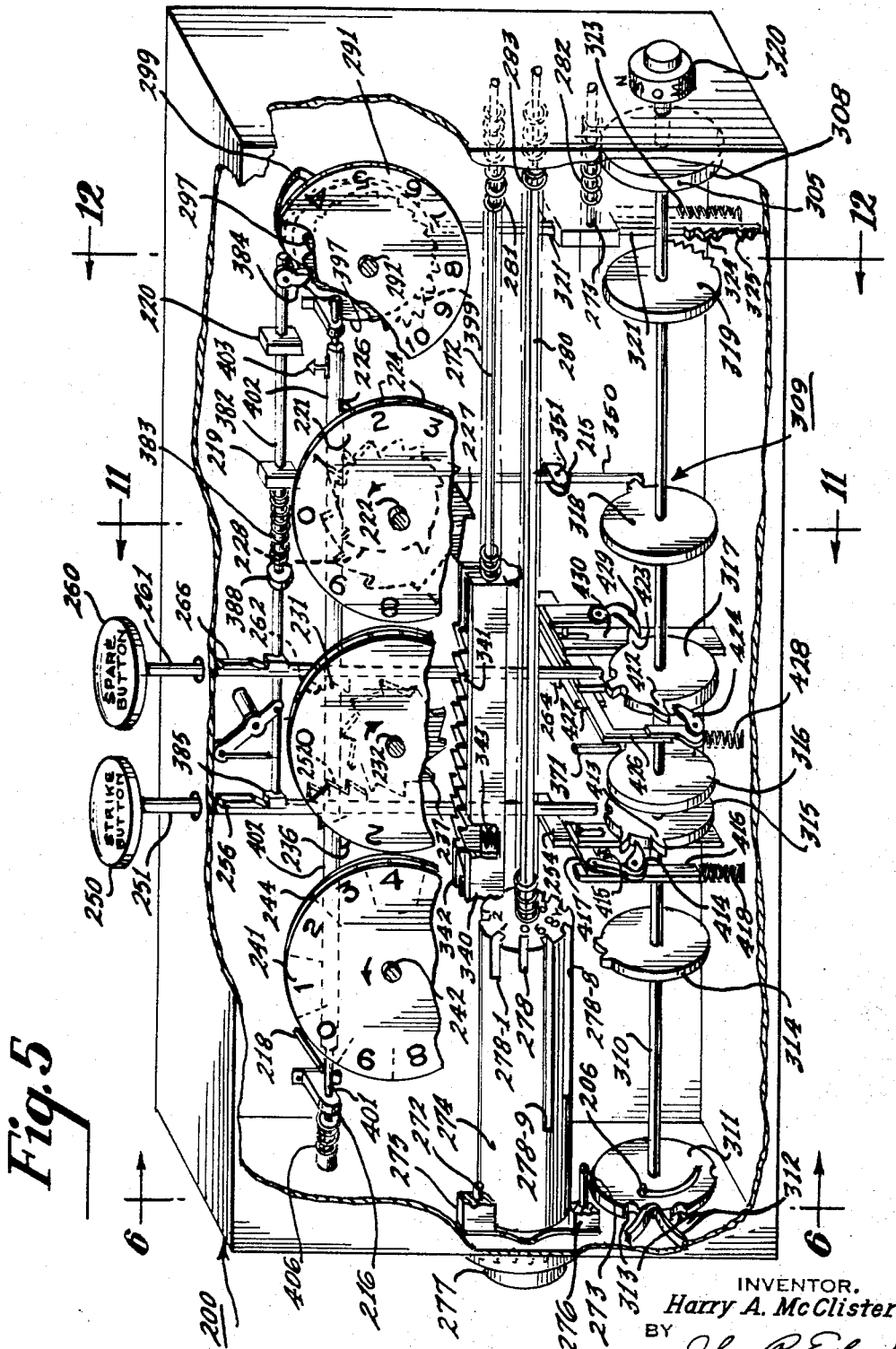

Oct. 22, 1968

H. A. McCLISTER 3,406,902

BOWLING SCORER

Filed June 13, 1966

8 Sheets-Sheet 4

INVENTOR.
Harry A. McClister
BY
John R. Ewbank

ATTORNEY.

Oct. 22, 1968 H. A. McCLISTER 3,406,902
BOWLING SCORER
Filed June 13, 1966 8 Sheets-Sheet 5

INVENTOR.
Harry A. McClister
BY John R. Ewbank
ATTORNEY.

Oct. 22, 1968

H. A. McCLISTER 3,406,902

BOWLING SCORER

Filed June 13, 1966

8 Sheets-Sheet 6

INVENTOR.
Harry A. McClister
BY John R. Eubank

ATTORNEY.

Oct. 22, 1968  H. A. McCLISTER  3,406,902
BOWLING SCORER
Filed June 13, 1966  8 Sheets-Sheet 7
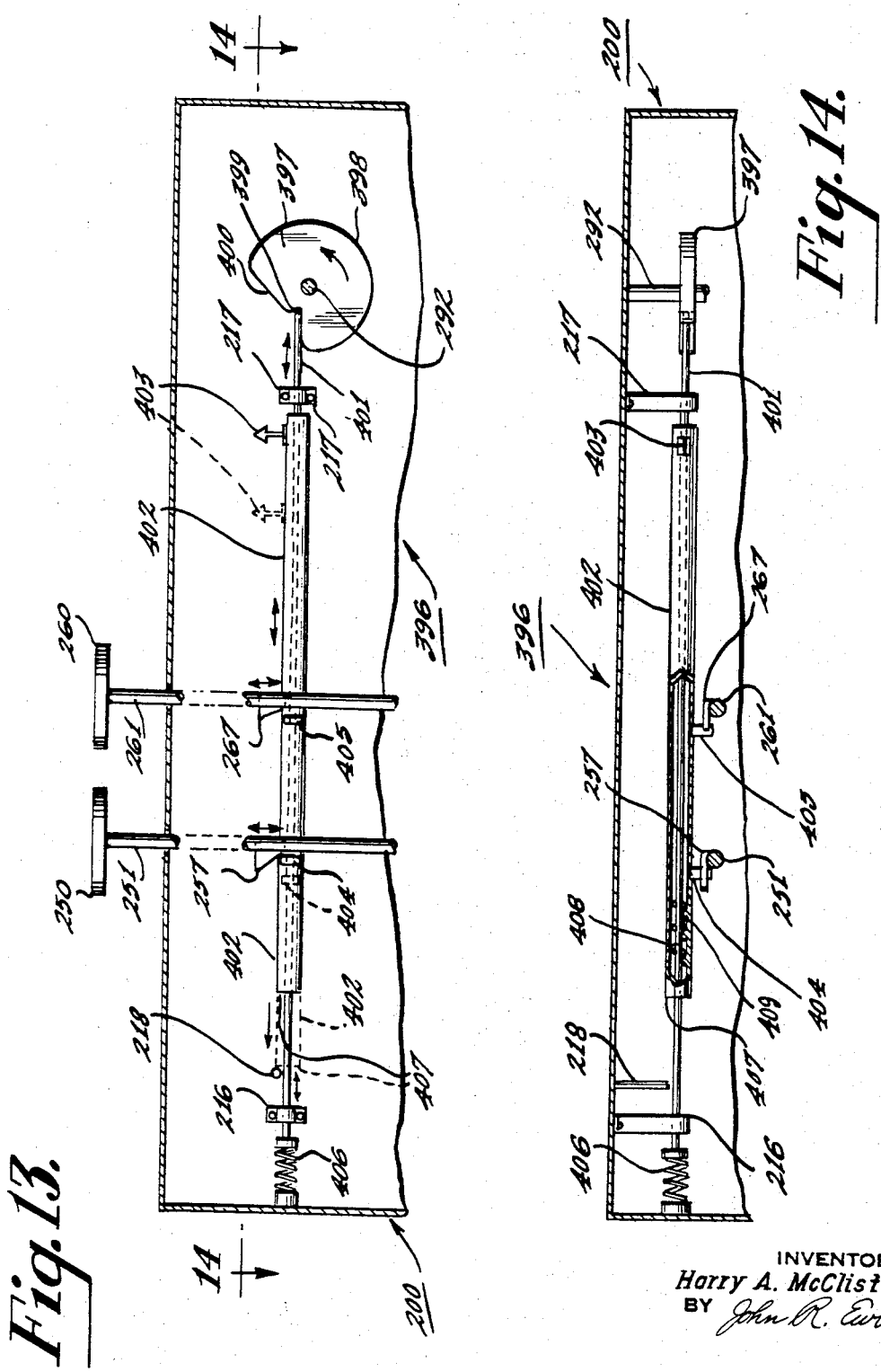
INVENTOR.
Harry A. McClister
BY John R. Ewbank
ATTORNEY.

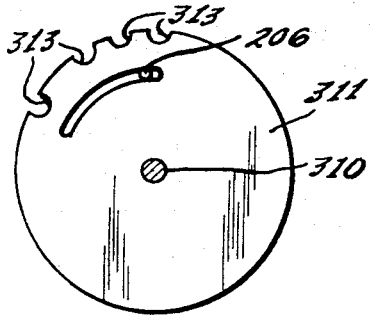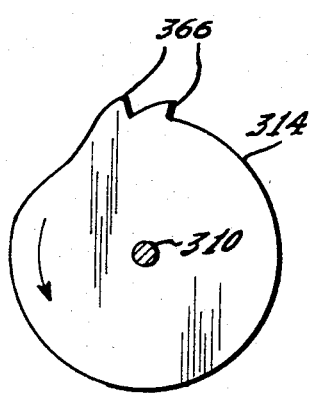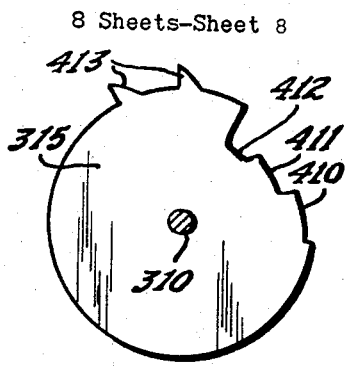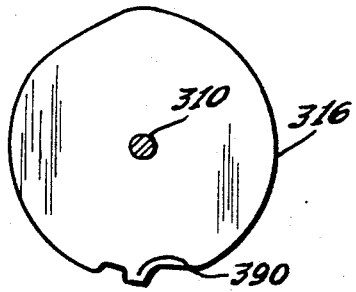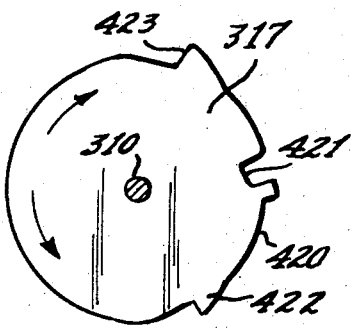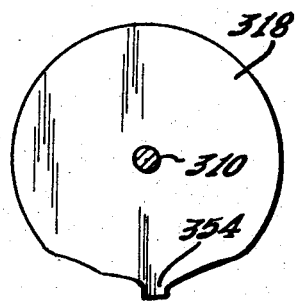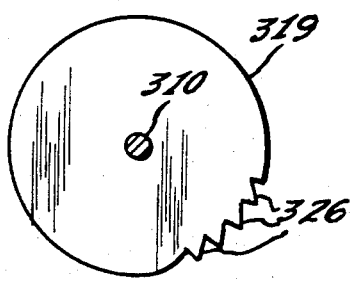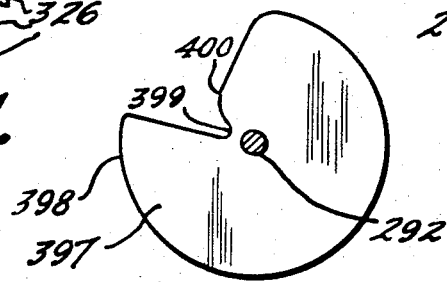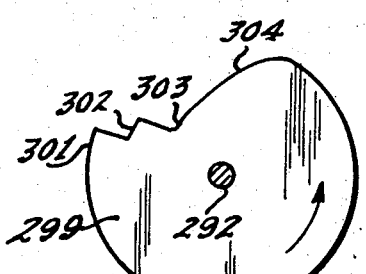

United States Patent Office 3,406,902
Patented Oct. 22, 1968

3,406,902
BOWLING SCORER
Harry A. McClister, Morrisville, Pa.; Ruth W. McClister and The Fidelity Bank, executors of Harry A. McClister, deceased, assignor to Delmor Lanes
Filed June 13, 1966, Ser. No. 557,293
3 Claims. (Cl. 235—114)

This invention relates to apparatus and methods for determining the total score earned by a player in a game of bowling as played under rules of the general type used by the American Bowling Congress.

In the game of bowling, ten pins are positioned at the end of an alley, and the player rolls the ball in an effort to knock down as many pins as feasible. If all ten pins are knocked down by the first ball of a frame, the achievement is called a "strike." If the ten pins are knocked down by the two successive balls, it is called a "spare." If less than ten pins are knocked down by the two balls of a "frame," the marginal increase in the score is adjusted in response to the pin knockdown, and the pins are repositioned for the next frame. In frames 1 thru 9, a player has one ball if a strike or a maximum of two balls if not a strike. In the tenth frame, if the knockdown is 9 or less, there is no bonus period, and there are only two balls, but if there is a strike, there are 2 balls in the bonus period, and if there is a spare, there is one bonus ball.

In conventional scoring of bowling, the strike earns 10 plus a reward of whatever is earned by the next two balls. The spare earns 10 plus a reward of the pin knockdown on the next ball. It has been customary to postpone entry of the score for a frame involving a strike or spare until after the rewards are known. Twelve strikes in a row provide the perfect score of 300. A knockdown of 9 in each frame yields a score of 90. Thus the rewards for strikes and spares are a very significant aspect of the calculation of the total score. A variety of electronic bowling scoring devices rely upon such traditional postponed scoring system.

In accordance with the present invention, a method is provided for "instant" scoring of bowling by the use of a mathematical system providing an assurance that at the end of the game, the score resulting from the "instant" method is reliably identical to the score derived by the "postponed" scoring system. Said method is practiced in a bowling scorer provided with a memory device shiftable among at least four states, designated as neutral, spare, strike, and double strike. By entering strikes, spares, and pin knockdowns, the status of the memory device is altered and the marginal increases in the score are recorded. In a preferred embodiment of the invention, a framecounter is provided so that after a score has been entered for a frame, the frame dial is advanced. In the automatic shifting of the status of the memory device during frames 1 through 9, actuation of the strike button advances the brain to strike status, or if already there, advances it to double strike. Actuation of the unit button retards the brain from double strike to strike, or from strike to neutral, or from spare to neutral. If the spare button is actuated, the brain is either advanced from neutral to spare or retarded from strike to spare. Thus, prior to any bonus period, the advancing or retarding of the memory device is responsive to the selections made among the strike, spare, and unit buttons. In a preferred embodiment, upon entering the bonus period, a spring latch retards the memory from double strike to spare, or from strike to neutral, or from spare to neutral, or if already in neutral, no bonus period will begin. The mathematical system of instant scoring and the automatic shifting amongst the four states of the memory device are particularly emphasized features.

Figure 6:
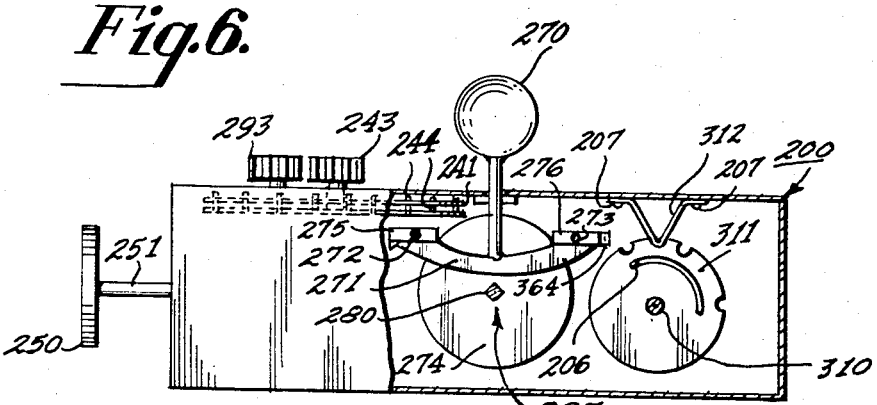
Figure 7:
Figure 8:
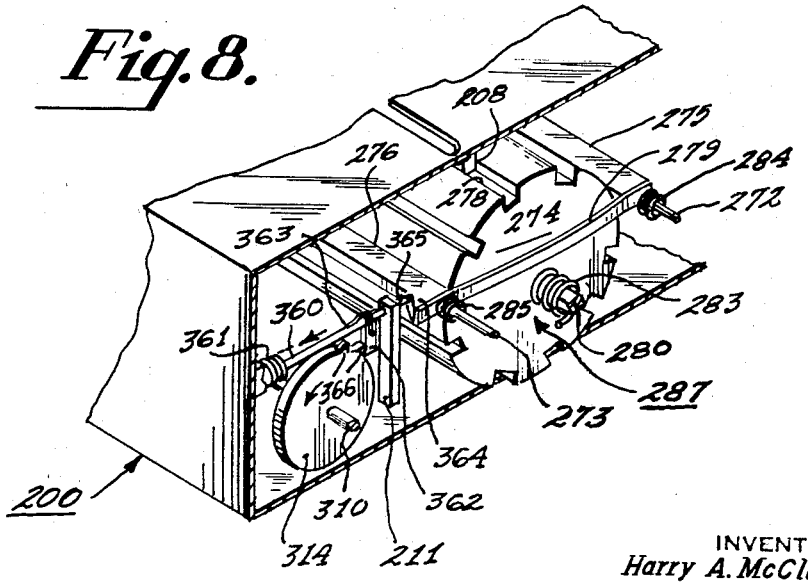
Figure 9:
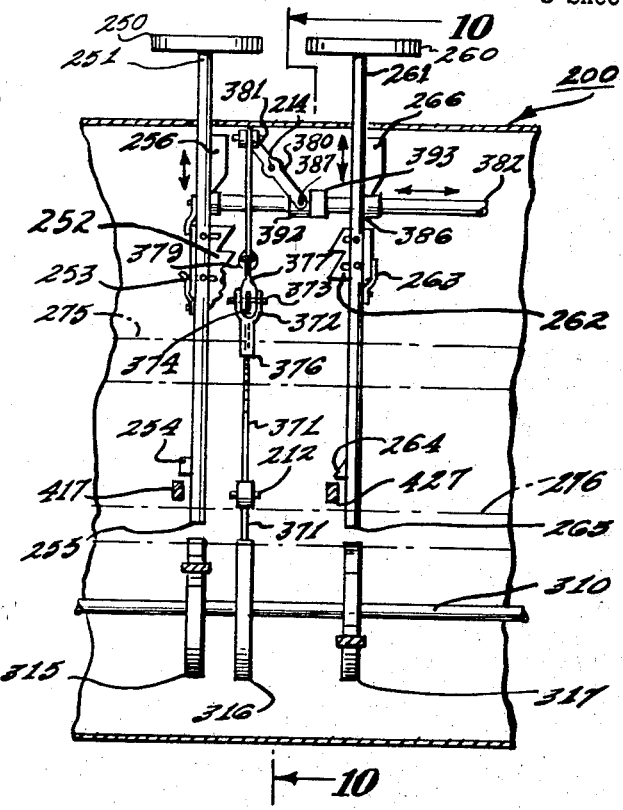
Figure 10:
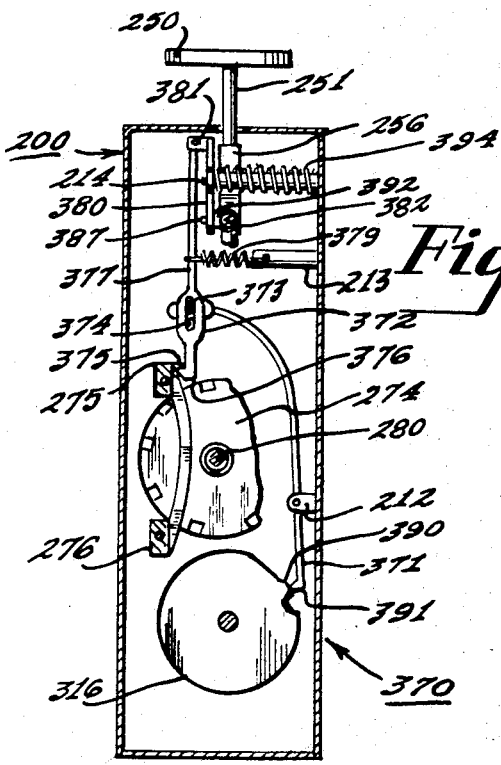
Figure 11:
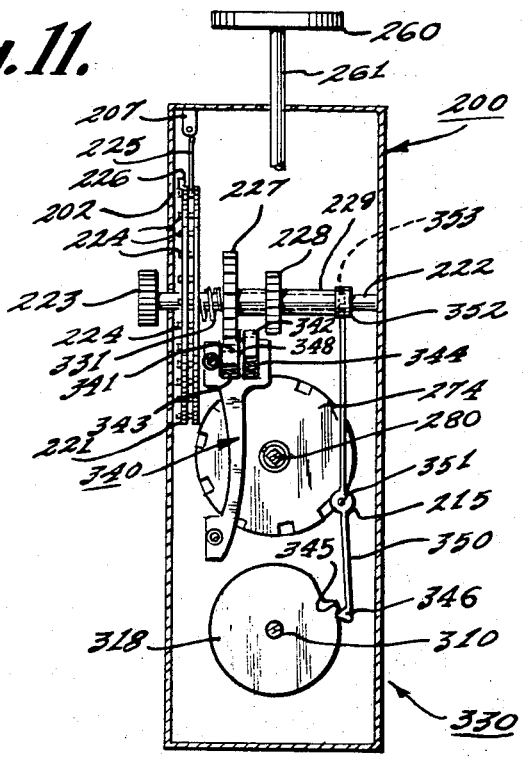
Figure 12:
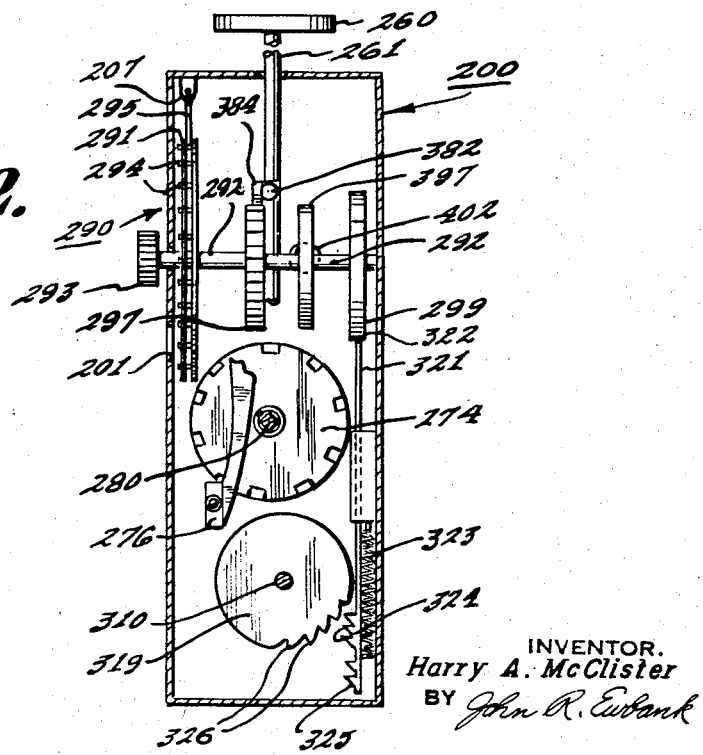

In the drawings, FIG. 1 is a front view of an illustrative embodiment of a scorer featuring a mechanical memory device. FIG. 2 is a top view. FIG. 3 is a left end view. FIG. 4 is a right end view. FIG. 5 is a schematic showing of some of the internal portions of the mechanical scorer. FIG. 6 is a sectional view taken on line 6—6 of FIG. 5. FIG. 7 is an enlarged view of a central portion of FIG. 5. FIG. 8 is a perspective view looking leftwardly toward the faces of disc 314 and spool 274 of FIG. 5. FIG. 9 is a sectional view taken on lines 9—9 of FIG. 2. FIG. 10 is a sectional view taken on line 10—10 of FIG. 9. FIG. 11 is a sectional view taken on line 11—11 of FIG. 5. FIG. 12 is a sectional view taken on line 12—12 of FIG. 5. FIG. 13 is a schematic sectional view taken on line 13—13 of FIG. 2. FIG. 14 is a schematic sectional view taken on line 14—14 of FIG. 13. FIGS. 15 through 23 are schematic views of selected components.

Portions of the exterior are shown in FIGS. 1–4. A shell 200 has a plurality of openings, internal extensions, webs, standards, and bearings, only some of which are shown in the predominantly schematic drawings. Windows 201–204 permit observation of frame dial 291 (FIG. 5), unit dial 221, tens dial 231, and hundreds dial 241, the designations being of course respectively. Window 205 permits observation of instruction 305 for scoring the first ball. A stop 206 (FIGS. 5 and 6) limits movement of brain keeper disc 311. Anchors 207 are supports for various keeper springs urging arcuate movements to be stepwise instead of continuous. Spool 274 is adjusted so that one of slots 278 engages with stop 208 to limit the rightward movement of spool 274 and associated components.

A standard 211 (FIG. 8) supports rod 360 for sliding action in the system for retarding the brain in response to unit button actuation. A pivot support 212 (FIG. 10) permits curved rod 371 to pivot to disengage or engage the system 370 associating frame actuating rod 382 and unit button 270. A spring support 213 (FIG. 10) positions one end of spring 379. A pivot support 214 (FIGS. 9 and 10) is a pivot for linkage 380 of the 370 system. A pivot support 215 (FIG. 11) permits the pivoting of rod 350 in the system entering unit button scores at double scale when the brain is in strike status. Standards 216 and 217 (FIGS. 13 and 14) support rod 401 of bonus ball indicator system 396. Stop 218 limits the leftward movement of tube 402 when frame dial 291 is adjusted by knob 293 to zero at the beginning of a game. Standards 219 and 220 (FIG. 5) support frame actuating rod 382 of the system 290 for advancing frame dial 291. Similar bearings, standards, and guides extending inwardly from shell 200 cooperate in maintaining various components in correct relationship, but are not shown in the schematic drawings.

Unit dial 221 (FIG. 5), tens dial 231, and hundreds dial 241 are mounted on shafts 222, 232, 242, and may be manually turned by knobs 223, 233, 243. Rungs 224, 234, 244 cooperate with keeper springs 225, 235, 245 to maintain stepwise rotation of the dials. A tooth 226 on the unit dial can actuate a portion of rung 234 to advance tens dial 231. Similarly, tooth 236 on the tens dial advances hundreds dial 241 one step (36°) for each rotation of the tens dial, thus maintaining the conventional interrelationships of dials of an arabic number system counter. Such portions of rungs 224, 234 can extend from the dials so that teeth 226, 236 do not interfere with the operation of keeper springs 225, 235. Actuation of unit button 270 can advance unit dial 221 through either ten-toothed ratchet wheel 227 or five-toothed ratchet wheel 228 (FIG. 11). A ten-toothed ratchet wheel 237 on shaft 232 can advance the tens dial when either the strike button 250 or spare button 260 is actuated.

Strike button 250 and spare button 260 have shafts 251, 261, and racks 252, 262, retractable but yieldingly urged against ratchet wheel 237 by springs 253, 263. Strikers 254, 264 near the lower portions of shafts 251, 261 actuate mechanisms for shifting the status of the brain. When one of buttons 250, 260, is pushed, shaft ends 255, 265, can be depressed only to limits set by cams 315, 317. Such button operation forces framecounter cams 256, 266, to actuate frame actuating rod 382. If, but only if, scoring the tenth frame, bonus indicator cams 257, 167 (FIGS. 13, 14) actuate tube 402 of bonus ball indicator system 400.

Rods 272, 273 (FIGS. 5, 6, 7, and 8) are removably secured to the two ends of shell 200 so they extend the length of scorer. A frame counter cam 275 slides on rod 272. A brain return cam 276 slides on rod 273. Unit button 270 extends from a bridge 271 joining the frame counter cam 275 and brain return cam 276. A similar bridge 279 joins the other ends of the cams, and between the bridges 271, 279 are the ends of spool 274. A sled 287, consisting of a rectangle of cams 275, 276, bridges 271, 279, surrounding spool 274, is slideable as a unit and controlled by unit button 270. A square shaft 280 is journaled in the ends of shell 200 and can be rotated by knob 277. Thus, turning of knob 277 also rotates spool 274, which is slidably mounted on square shaft 280. Grooves 278 in spool 274 correspond with numbers on knob 277, so that when unit button 270 is slid rightwardly, the sled 287 is stopped as stop 208 extending from shell engages the end of the selected groove 278. If the knob 277 has been adjusted to zero, then the sliding of unit button is stopped before rack carrier 340 is slid. If the knob is adjusted to 9, then the sled can be slid until 9 teeth of the rack associated with the rack carrier 340 engages one of ratchet wheels 227, 228, to advance unit dial 221. Springs 281, 282, 283 on rods 272, 273, and shaft 280 are compressed by the rightward sliding of rack carrier 340. On the return stroke, such springs urge the rack carrier 340 against stop 286 and sled 287 to return to its normal leftmost positions. Springs 284, 285 on rods 272, 273 between rack carrier 340 and bridge 279 provide further assurance of the return of the sled.

A framecounter system 290 includes a frame dial 291 mounted on shaft 292 which must be manually adjusted by knob 293 to display zero at the beginning of a game. Rungs 294 cooperate with keeper springs 295 for the stepwise unidirectional rotation of frame dial 291. A ratchet wheel 297 on shaft 292 has 20 teeth, thus differing from ten-toothed ratchet wheels 227, 237. A unidirectional slipping pawl 384 advances ratchet wheel 297 when frame actuating rod 382 returns to normal position at the final stage of the return stroke of any of buttons 250, 260, 270, except when spare or double strike status of the brain disengages button 270. Rod 382 is slideably mounted in standards 219, 220, and is yieldingly urged leftwardwardly by spring 383 between standard 219 and a flange 388. Followers 385, 386, on rod 382 engage with framecounter cams 255, 265 on shafts 251, 261 so that actuation of a button 250 or 260 pushes rod 282 rightwardly at the beginning of the actuation stroke, and does not permit spring 383 to energize the pawl-actuation of ratchet wheel 297 until near the end of the return stroke of the button.

A more complex system 370 (FIGS. 9 and 10) associates unit button 270 with frame actuating rod 382. When the brain has neutral or strike status, during the initial stages of the actuation stroke of unit button 270, lobe 375 on framecounter cam 275 acts upon follower 376 of rod 377 to pull downward rod 377, thus pivoting linkage 380 to shift rod 382 rightwardly. During the final stages of the subsequent return stroke of the unit button, the frame dial 291 is advanced by the action of spring 383.

The lower arm of linkage 380 is connected to pivot 387 on a sleeve 392 which can press against flange 393 on frame actuator rod 382. A spring 394 urges linkage 380 and related components to maintain normal positions during movement of rod 382 actuated by strike or spare buttons. Linkage 380 is pivoted on a pivot support 214 which extends inwardly from the back of shell 200.

Tension spring 379 extends between rod 377 and spring support 213 and normally urges rod 377 to pivot from pivot 381 on the upper arm of linkage 380 into a disengaged position so that follower 376 of rod 377 cannot engage with the lobe 375 of framecounter cam 275 while the brain is in spare or double strike status. When the brain is shifted to neutral or strike status, rod 377 is shifted into operative position. A follower 391 at the end of the short arm of curved rod 371 engages with cam 316 of brain 309 and can be actuated by lobe 390 to shift follower 376 into zone for engagement with lobe 375 of cam 275 when the brain has neutral or strike status. A curved rod 371 pivoted at pivot support 212 swings rod 377 so that follower 376 is shifted into the zone of influence of lobe 375 of cam 275. A yoke 372 on curved rod 371 supports a pin 373 which slides in slot 374 in rod 377, whereby the rods 371 and 377 may maintain connection while pivoting from 212 and 371.

FIGS. 5 and 7 show that sliding of unit button 270 for a pin knockdown of 1 to 9 pushes rack carrier 340 leftwardly. FIG. 11 illustrates a system 330 whereby such shifting of the rack carrier 340 advances unit dial 221 at single scale when the brain has neutral, spare, or double strike status, but at double scale when the brain has strike status. Ten-toothed ratchet wheel 227 and five-toothed ratchet wheel 228 are attached to and a part of sleeve 229 splined to unit dial shaft 222 but slideable axially thereon. Spring 331 normally urges sleeve 229 rearwardly so that rack 341 engages with ten-toothed ratchet wheel 227. When the memory device is shifted to strike status, cam 318 on brain shaft 310 rotates to push lobe 345 against follower 346 to pivot rod 350 about pin 351 in pivot support 215. A yoke 352 at the upper portion of rod 350 engages in groove 353 to slide sleeve 229 on shaft 222, thus compressing spring 331, disengaging wheel 227 from potential engagement with rack 341, and shifting wheel 228 into a position for engagement with rack 342, thus permitting dial 221 to be advanced by unit button 270 at double scale only when the brain has strike status. Unit dial is unaffected by the return stroke of rack carrier 340, inasmuch as springs 343, 344 permit racks 341, 342 to slip under wheels 227, 228. A wall 348 separates the slots in which racks 341, 342 are yieldingly supported in rack carrier 340.

The memory device 309 (sometimes designated as the brain) is shiftable among four states, neutral, spare, strike, and double strike. Completion of a game shifts the brain to neutral. Actuation of the strike button advances the brain to strike or double strike. Actuation of the unit button retards the brain from double strike to strike, or from strike to spare to neutral. Actuation of the spare button either retards the brain from strike to spare or advances from neutral to spare. During the bonus period, framecounter retardation of the brain dominates the tendencies initiated by strike and spare buttons.

A disc 311 has four notches, cooperating with keeper spring 312 to assure stepwise arcuate movement among the four states. Brain return cam 275 has lobe 364 (FIG. 8) actuating follower 365 on rod 360, which is yieldingly pushed against cam 275 by spring 361. A standard 211 permits sliding of rod 360. Single toothed pawl 362 is urged by springs 363 into engagement with teeth 366 on brain disc 314, so that pawl 362 slips over tooth 366 during actuation of unit button 270, and so that pawl 362 engages tooth 366 to retard the brain a single step during the zero segment of the return stroke of sled 287.

Strike cam 315 on brain shaft 310 has cam lobes 410, 411, and 412, adapted to limit the extent of depression of the bottom surface 255 of the shaft 251 of strike button 250, whereby 1, 2, or 3 teeth of rack 252 engage with ratchet wheel 237 to advance the tens dial for increasing the score by 10, 20, 20, or 30, according to whether the brain is in neutral, spare, strike, or double strike status. Spring 415 permits pawl 414 to slip over teeth 413 during the depression of strike button, but to advance the brain upon the return stroke, which is energized by spring 418, which acts upon member 414 supporting the pawl. Spring 418 urges strike button 250 to return to its normal position through forces transmitted by crossarm 417 and striker 254.

Similarly, the spare cam has lobes 420, 421 for single scale or double scale scoring (i.e., 10 or 20) according to whether the brain is in neutral or strike status. Spare button 260 is locked in spare cam 317 when the brain is in spare or double strike status. Striker 264 on spare shaft 261 hits crossarm 427 to depress pawls 424, 429 slipping past teeth 423, 422 on supports 426, 430. When spring 428 urges the return stroke, the brain is either advanced from neutral to spare, or retarded from strike to spare, responsive to the previous status.

Operation of cam 316 for disengaging the frame actuating rod 382 from unit button 270 while the brain has spare or double strike status has been explained. Only when the brain has strike status does cam 318 impose double scale scoring upon unit button 270. Disc 308 has indicia 305 visible thru window 205 to advise a player when the first ball of a frame must be scored, that is, while the brain has spare or double strike status.

At the beginning of any bonus period, brain 309 is retarded as rod 321 moves upwardly to engage ratchet wheel 319 on shaft 310. Just prior to any second bonus ball, rod 321 again moves upwardly to shift the brain from spare to neutral. The first stage of operation of rod 321 retards the brain from double strike to spare, or from strike to neutral, or from spare to neutral, and such operation dominates any advancement of the brain by scoring of the tenth frame. As shown in FIG. 12, upper end 322 of rod 321 is pushed against brain retarding cam 299 by action of spring 323, and is latched so that teeth 324, 325 on rod 321 are disengaged from teeth 326 on brain wheel 319 during all times except momentary actuation during the bonus period. Thus wheel 319 and brain 309 can move freely prior to the bonus period. Follower 322 is latched against surface 301 (FIG. 23) until the scoring of frame 10, when it is unlatched to rest on surface 302. Upon the scoring of the first of two bonus balls, follower 322 is unlatched to rest on surface 303 for second stage actuation of rod 321. In starting a new game, knob 293 of frame shaft 292 is rotated to latch follower 322 across surface 304 onto surface 301 of brain retarding cam 299, thus recompressing spring 323.

To advise a player how many bonus balls he has earned, an indicator system 396 features an arrow 403 which is hidden to the left of window 431 during frames 1–9 (sometimes conveniently called the "3" position) and which is hidden to the right of window 431 (sometimes called the "minus 1" position) after the scoring of frame 9 and prior to the scoring of frame 10. Spring 406 keeps rod 401 latched against surface 398 of bonus indicator cam 397 during frames 0–9. Upon the scoring of frame 9, rod 401 is unlatched onto surface 399 (FIG. 22) of cam 397, whereby arrow 403 shifts to the minus 1 position. Upon the scoring of frame 10, surface 400 of cam 397 pushes rod 401 leftwardly. If less than 10 pins are knocked down in the tenth frame, arrow 403 is thus slid from minus 1 to zero, and can be seen thru window 431. If a spare is scored in the tenth frame, cam 267 actuates follower 405 on tube 402 so that when rod 401 is pushed leftward by surface 400, arrow 403 shifts to the 1 position, and player is notified he has earned 1 bonus ball. Similarly, if a strike is scored in the tenth frame, cam 257 hits follower 404 so that rotation of cam 397 for engagement of surface 400 shifts arrow 403 to the 2 position. Actuation of strike and spare buttons has no influence upon followers 404, 405 before or after the scoring of the tenth frame, inasmuch as cams 257, 267 can be engaged only when rod 401 contacts surface 399 after the scoring of the ninth frame and prior to the entry of the score for the tenth frame. Upon starting a new game, rotation of knob 293 latches rod 401 against surface 398 of cam 397, thus compressing spring 406 and forcing tube 402 against stop 218 to return it to a neutral position. Movement between tube 402 and rod 401 is maintained stepwise by reason of a keeper spring 408 on rod 401 engaging with grooves 409 in the tube.

*Operation of the scorer*

Sometimes bowlers prefer to total the score for several successive games, so that readjustment of dials 221, 231, 241, to zero is optional. Rotation of frame dial 291 to zero is essential, thereby compressing springs 323, 406 and latching rods 321, 401 against outermost surfaces 301, 398 of brain retarding cam 299 and bonus indicator cam 397 on shaft 292. Immediately after each event, the player actuates whichever of unit, strike, or spare buttons, if any, need pushing in view of the player's achievements, and the scorekeeping device handles all of the mathematical problems peculiar to the scoring of bowling, including the instruction concerning whether the first ball of a frame should be scored. Unless the first ball is a strike, or unless instruction 305 appears at windows 205, the first ball is not scored. Framecounter dial 291 shows how many frames have been scored. Upon scoring frame 9, bonus arrow 403 is unlatched from position 3 to position minus 1, both hidden from window 431. If a strike is made on the first ball of frame 10, the actuation of button 250 shifts arrow 403 from minus 1 to 1, and upon the return stroke of button 250, shaft 292 advances 18° so that rod 401 is pushed onto surface 400 of cam 397, thereby shifting arrow 403 to position 2. Although actuation of button 250 temporarily shifts the brain to strike or double strike, subsequent actuation of the framecounter, to 10 unlatches rod 321 to retard the brain to spare from double strike or to neutral from strike. As the framecounter is advanced from 10 to B−1, the brain is further retarded from spare to neutral if necessary. Any matching of displays at windows 431 and 201, such as 0 bonus balls and F−10, or 1 and B−1, or 2 and B−2, notifies the player that the game has ended.

Each of buttons 250, 260, 270, when moved thru an advancing stroke and return stroke, accomplishes three operations in succession. The score is advanced from 0 to 30 points, and then the brain is advanced or retarded if feasible. Then the framecounter is advanced. In F−10 and B−1 scoring, further actions result from framecounter advancement. The score at the end of the game by "instantaneous" scoring is reliably identical to that resulting from conventional postponed scoring.

Various modifications of the invention are possible without departing from the inventive concepts set forth herein. A system of solenoids and switches has been designed which is the full equivalent of the mechanical embodiment. Hydraulic, pneumatic, electronic, and other arrangements could operate similarly to the preferred mechanical embodiment. All such devices and methods featuring the "instantaneous" scoring concepts and use of a memory system having at least four states are within the scope of the appended claims. Various modifications of the mechanical form of scorer are possible without avoidance of the appended claims.

The invention claimed is:

1. A bowling scorer consisting essentially of the combination of: a memory device shiftable to have any status among neutral status, spare status, strike status, and double strike status; a unit dial, tens dial, and hundreds dial, said unit dial, tens dial, and hundreds dial being decimally associated for displaying a three digit number indicative of the cumulative bowling score subsequent to the zero adjustment of the dials; a framecounter dial displaying a number by which the player can recall the number of frames previously scored; a strike button; means associating the strike button and the tens dial whereby actuation of the strike button increases the score by 10 when the memory device is in neutral status, whereby actuation of the strike button increases the score by 20 when the memory device is in strike status, and whereby the actuation of the strike button increases the score by 30 when the memory device is in double strike status; a spare button; means associating the spare button and the tens dial whereby actuation of the spare button increases the score by 10 when the memory device is in neutral status, and whereby atcuation of the spare button increases the score by 20 when the memory device is in strike status; a unit button; means associating the unit button and unit dial whereby the unit dial is advanced by the number actuated by the unit button when the memory device is in any status other than strike status and whereby the unit dial is advanced by twice the number actuated by the unit button when the memory device is in strike status; means associating the memory device with the unit button, strike button, and spare button whereby actuation of such buttons adjusts the memory device, subsequent to advancing the score, to a status indicative of the previous events of the game; means disengaging the actuation of the framecounter during the actuation of the unit button when the memory device is in spare status and while the memory device is in double strike status, said means transmitting the actuation of the unit button to actuate the framecounter while the memory device is in neutral status and while the memory device is in strike status; and means associating the framecounter with the spare button and with the strike button, whereby actuation of such buttons advances the framecounter subsequent to such score-advancing operation and memory adjustment operation.

2. In a bowling scorer, the combination of a dial displaying tens of a three digit number, a gear moving said dial, said gear having ten teeth, a strike button, means associating the strike button and the ten-toothed gear so that the gear is advanced by at least one but not more than three teeth by the actuation of the strike button, memory device means controlling the selection of from one to three tooth advancement of the ten toothed gear, and memory device advancement means whereby upon initial actuation of the strike button, the gear is advanced by one tooth, and thereafter the memory device is advanced, upon the second successive actuation of the strike button, the gear is advanced by two teeth, and thereafter the memory device is advanced, and upon the third and subsequent successive actuations of the strike button, the gear is advanced by three teeth.

3. In a bowling scorer a memory device shiftable to any of neutral, status, spare status, strike status, and double strike status, means associating the memory device with a spare button, a dial displaying tens of a three digit number indicative of the bowling score, a ten-toothed gear on the shaft of said dial, means associating the spare button with the ten-toothed gear so that actuation and return of the spare button while the memory device is in neutral status advances the gear by one tooth and thereafter advances the memory device to spare status, and so that actuation and return of the spare button while the memory device is in strike status advances the gear by two teeth and thereafter retards the memory device from strike status to spare status.

References Cited

UNITED STATES PATENTS

| | | | |
|---|---|---|---|
| 3,100,602 | 8/1963 | Lear Voo | 235—63 |
| 3,184,583 | 5/1965 | Bawtinheimer | 235—92 |
| 3,250,534 | 5/1966 | Watts | 273—54 |
| 3,282,499 | 11/1966 | Zentarra | 235—65 |
| 3,295,849 | 1/1967 | Miller et al. | 273—54 |
| 3,305,958 | 2/1967 | Price | 40—68 |

STEPHEN J. TOMSKY, *Primary Examiner.*